United States Patent [19]

Adolphi et al.

[11] Patent Number: 5,717,454
[45] Date of Patent: Feb. 10, 1998

[54] METHOD AND APPARATUS FOR CREATING POSING MASKS ON VIDEO SCREEN

[75] Inventors: Earl John Adolphi, Eden Prairie, Minn.; Michael T. Breckenridge, Reno, Nev.; Michael J. Surma, Golden Valley, Minn.

[73] Assignee: Lifetouch Portrait Studios, Inc., Minneapolis, Minn.

[21] Appl. No.: 91,659

[22] Filed: Jul. 14, 1993

[51] Int. Cl.$^6$ .................................. H04N 5/222
[52] U.S. Cl. .................. 348/61; 348/64; 348/77; 354/75; 354/76; 395/135; 395/155
[58] Field of Search ................ 348/20, 61, 64, 348/77, 78, 564, 565; 354/75, 76, 220, 290, 292; 395/135, 155, 161

[56] References Cited

U.S. PATENT DOCUMENTS

| | | | |
|---|---|---|---|
| 4,246,605 | 1/1981 | La Russa | 348/565 |
| 4,255,766 | 3/1981 | Matsuda et al. | 348/564 |
| 4,261,012 | 4/1981 | Maloomian | 348/77 |
| 4,297,724 | 10/1981 | Masuda et al. | 348/77 |
| 4,539,585 | 9/1985 | Spackova et al. | 348/77 |
| 4,819,076 | 4/1989 | Briggs | 348/211 |
| 4,852,184 | 7/1989 | Tamura et al. | 348/78 |
| 4,922,543 | 5/1990 | Ahlbom et al. | 382/291 |
| 5,055,863 | 10/1991 | Lindenfelser et al. | 354/75 |
| 5,122,821 | 6/1992 | Nealon | 348/64 |
| 5,210,604 | 5/1993 | Carpenter | 348/61 |
| 5,264,933 | 11/1993 | Rosser et al. | 348/61 |
| 5,389,984 | 2/1995 | Lovenheim | 354/76 |

*Primary Examiner*—Howard W. Britton
*Assistant Examiner*—Frank Snow

[57] ABSTRACT

To facilitate creating professional poses for a person to be photographed, a posing mask generating system is provided including a microprocessor having a video graphics board therein. The microprocessor also has a memory and a data input and output device. A video camera is interfaced with the video graphics board so that a video image of a model to be photographed can be viewed on a display terminal. Using the data input device, a professional photographer, experienced in posing subjects, enters graphics information into the system which is then overlaid with the video image and appropriately positioned to define a mask or template defining the location for prominent features of the subject within the frame of reference. This is repeated for a number of possible poses, with the graphics information being stored in the memory of the microprocessor. Once all of the masks have been professionally created, they are transferred to one or more studios in different locations and manned by camera operators rather than professional photographers. The remote systems also include a microprocessor with a video graphics board installed therein, a video camera and a display terminal. The mask information previously generated by a professional is overlaid on a video image of the object to the photographed and then the camera or the object is positioned until its video image fits the master template. The camera shutter is then tripped to record the posed subject on film.

11 Claims, 3 Drawing Sheets

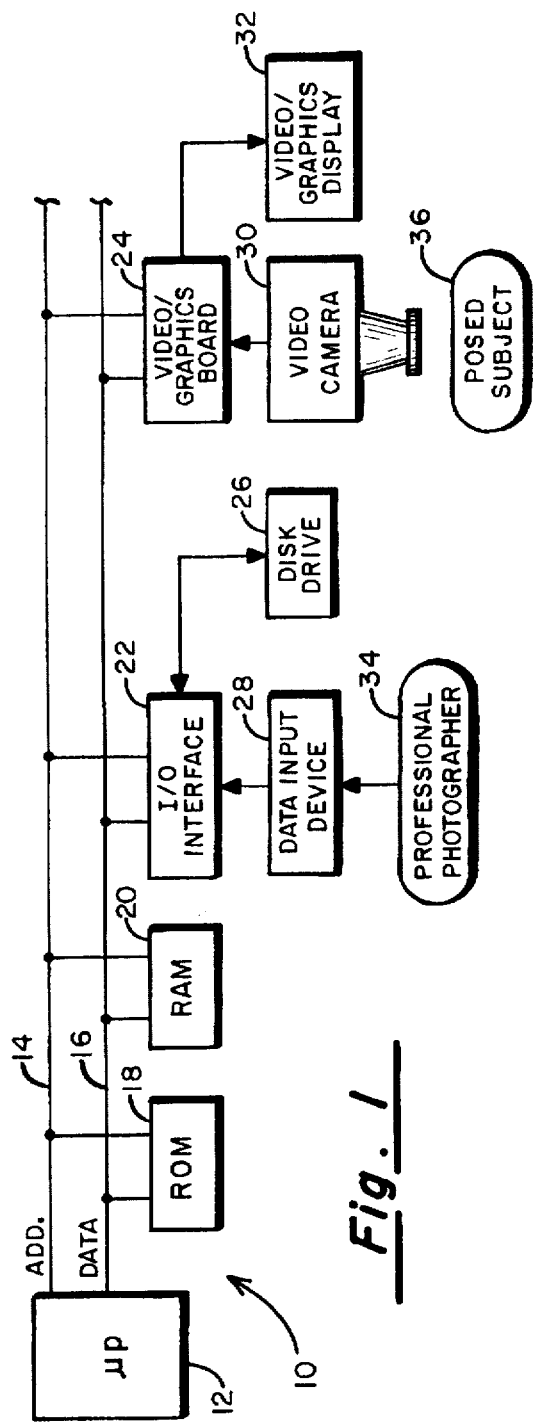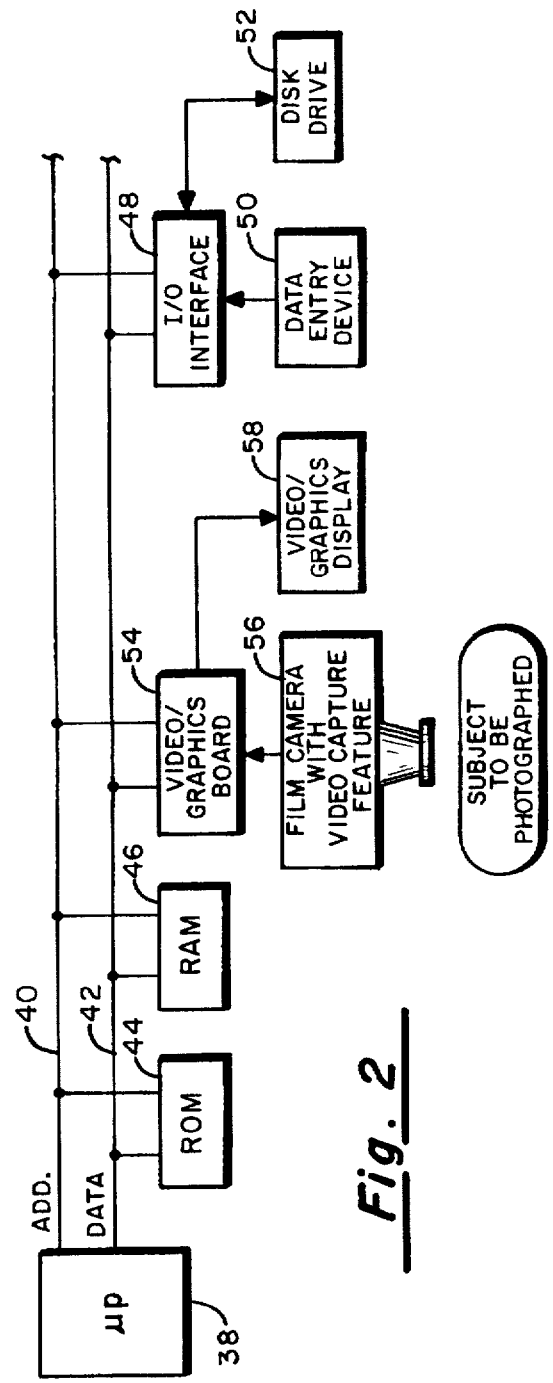

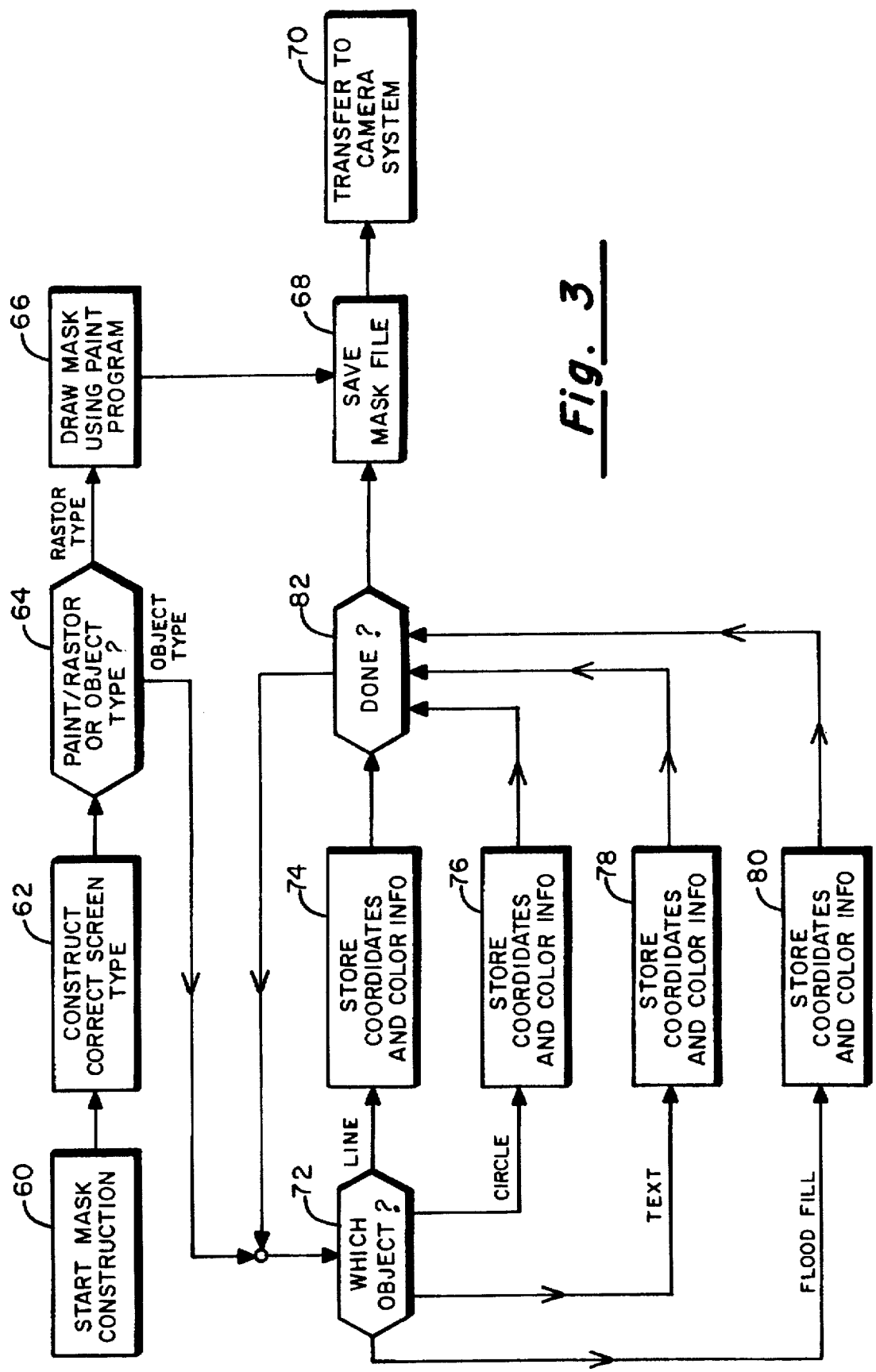

METHOD AND APPARATUS FOR CREATING POSING MASKS ON VIDEO SCREEN

BACKGROUND OF THE INVENTION

I. Field of the Invention

This invention relates generally to the field of portrait photography and more particularly to a method and apparatus for facilitating the taking of portrait photographs by providing a video image of the subject with a professionally created posing mask overlaid on the video image. The posing mask provides necessary information to a camera operator on how to position the camera relative to the subject so that when a picture is snapped, the subject will be optimally posed.

II. Discussion of the Prior Art

Many years of experience and training under the direction of a professional photographer are often required before a novice is able to master the art of posing a subject or a group of subjects in front of a portrait camera so that the resulting photograph will be properly balanced and aesthetically pleasing when a print is made. A professional photographer learns only from experience how to frame the subject in the camera's view finder, depending upon the pose desired. For example, when the subject is standing, his/her head should be in one position to achieve a desired dynamic symmetry whereas, when seated, the subject's head should be at a different location within the frame. Similarly, the subject's hands should be properly placed and, perhaps, the subject's shoulders should also be positioned in such a way that the resulting photograph captures, on film, an image of the subject that is most pleasing.

In group photography, such as a family portrait, each of the individuals must be appropriately positioned within the camera's field-of-view before the picture is taken. If the picture is to be a silhouette, the top-of-head and chin of the subject must be aesthetically aligned with the frame. As already mentioned, proper posing of a subject or subjects can take a long time to master.

In high volume, commercial portrait work, it is often desirable that relatively inexperienced camera operators be able to take professional looking pictures. For example, in a department store setting, an inexperienced attendant may be hired to take pictures, but typically will not have the training and experience background possessed by a professional photographer. Hence, it becomes necessary for an inexperienced operator to take numerous proof photos from different camera positions in hopes that a few may be satisfactory to a customer. This necessarily adds to the cost.

In U.S. Pat. No. 5,534,963 to Adolphi, et al., and entitled "Automated Portrait Studio" and assigned to the assignee of the present invention, there is described a portrait studio having a film camera that incorporates an optical system for creating a video image of the subject on a CRT screen where the video image is substantially identical to what would be captured on film when the shutter release is tripped. The portrait studio further includes a microprocessor including a memory for storing the video image. The video images can be subsequently reviewed by the customer by reading out the stored data and displaying same on a display terminal. A selection can then be made as to which are to be printed as photographs. While that system obviates the need for producing multiple proof photos, it still does not solve the problem of how to best compose the picture in the first instance.

It is accordingly a principal object of the present invention to provide a method and apparatus for imparting to an unskilled camera operator, the skill and experience of a professional photographer in posing a subject or group for a portrait photograph.

Another object of the invention is to provide an automated system for overlaying any one of a plurality of previously professionally created pose masks on a video screen along with an image of the subject so that an unskilled operator can, by adjusting the subject's physical position and/or the camera position and zoom, fit the subject's image to the mask before the photograph is taken.

SUMMARY OF THE INVENTION

The present invention is concerned with a method for facilitating the posing of a subject in a portrait studio setting and comprises the steps of providing a skilled photographer with a personal computer having a commercially-available video graphics board in one of its card slots, a data storage device, a video display terminal and a data input device operatively coupled to it. Also available to the skilled photographer is a video image capture device for providing video information to the video graphics board within the personal computer. The subject to be photographed is then positioned in the field-of-view of the video image capture device such that the image is presented on the display terminal. The experienced photographer then first poses the subject in a desired way and then creates mask information relating to the desired positioning of a subject to be photographed using the data input device for a plurality of different possible poses. The mask information comprising graphical symbols and text is stored in the data storage device for later retrieval.

Once all of the professionally created masks have been generated and stored on a machine-readable medium, that medium and the information thereon can be transferred to the memory of the microprocessor of a portrait camera of the type described in the aforereferenced Adolphi et al. application. Now, when a portrait of a subject is to be taken, an inexperienced camera operator, using a keyboard, a bar code reader or a mouse can select a particular pose mask from the memory of the microprocessor with the mask information being provided to the video graphics board, causing the mask lines to be overlaid on the video image of the subject. Then, by adjusting the zoom lens on the camera or by repositioning the camera or the subject, the subject's body parts, e.g., top of head, chin, shoulders, hands, etc., can be made to conform to the mask, thus insuring that the subject will be properly framed within the camera's field-of-view. Hence, when the shutter is snapped, the photograph taken will be of the subject posed in the manner previously designed by the skilled photographer.

DESCRIPTION OF THE DRAWINGS

Further features, objects and advantages of the invention will become apparent to those skilled in the art from the following detailed description of a preferred embodiment, especially when considered in conjunction with the accompanying drawings in which:

FIG. 1 is a block diagram of the hardware used by a professional photographer in creating a digitized posing mask;

FIG. 2 is a block diagram of the hardware used in overlaying a previously created digitized posing mask on a live video image;

FIG. 3 is a software flow diagram of the program executed by the microprocessor of FIG. 1 in creating pose masks.

DESCRIPTION OF THE PREFERRED EMBODIMENT

Figure 4:
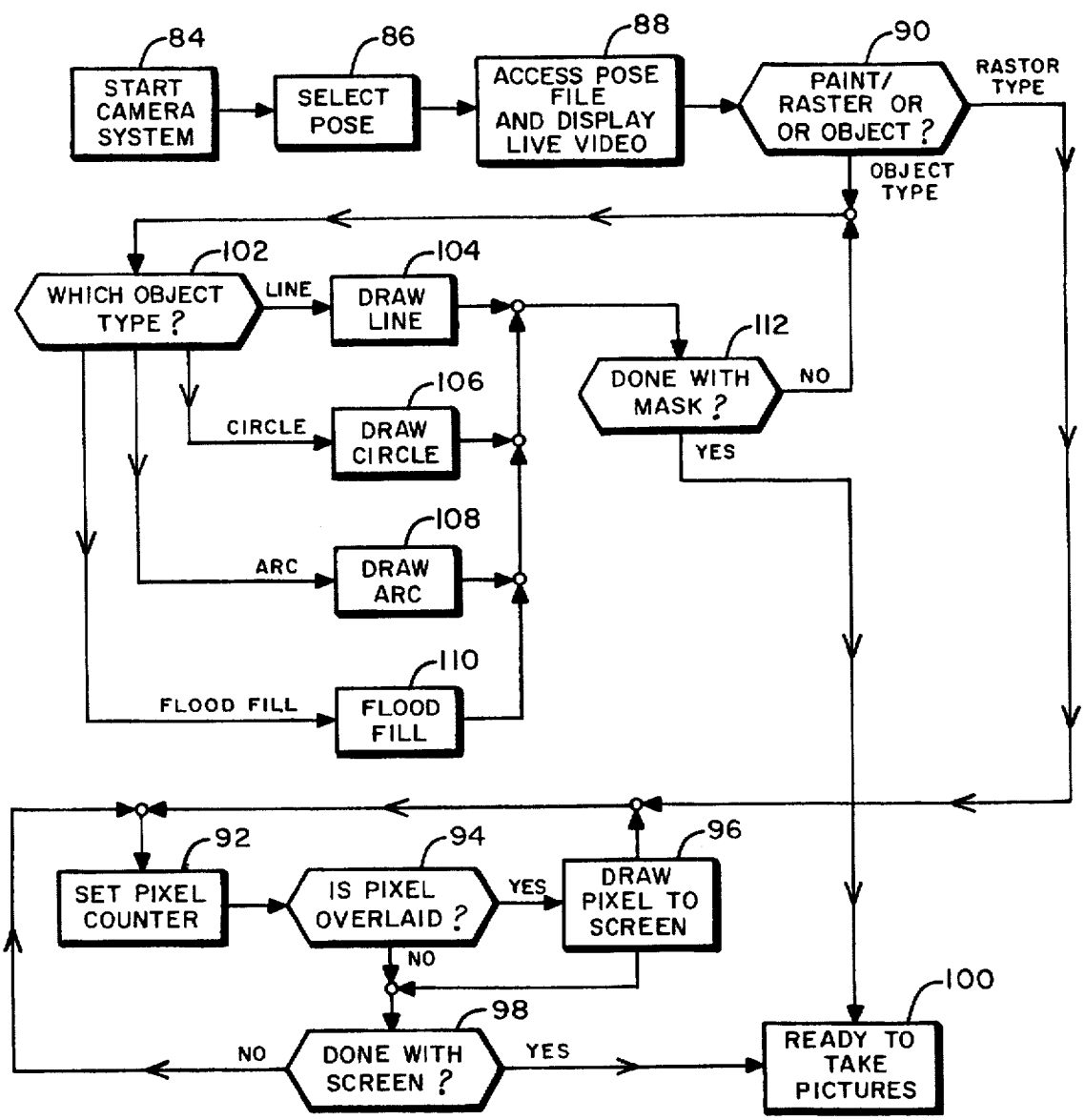
FIG. 4 is a software flow diagram of the program executed by the microprocessor in FIG. 2.

Referring to FIG. 1, there is indicated generally by numeral 10 a personal computer, including a microprocessor 12 having an address bus 14 and a data bus 16. Coupled in a conventional fashion to these two buses is a ROM memory 18, a RAM memory 20 and and I/O interface module 22. Also connected across the address bus 14 and the data bus 16 is a video graphics board 24 which may, for example, be of the type manufactured and sold by Matrox Electronics Systems Ltd. of Dorval, Quebec, Canada, and sold under the trademark, ILLUMINATOR-16®.

The I/O interface 22 is shown as being used to couple a disk drive 26 into the system as well as a data input device 28. The data input device may take any one of a number of forms including a keyboard, a bar code wand, a mouse, a touch screen or any other similar type device used for entering data into the RAM memory 20 under control of the microprocessor 12.

Shown coupled to the video graphics board 24 is a video camera 30 and a video/graphics display terminal 32. The Matrox video graphics board 24, when installed in a IBM® PC or a clone thereof provides a 32,768-color video graphics workstation with the ability to manipulate a 16-bit images on a pixel-by-pixel basis, store them in a 640×480 (the VGA standard) or 1K×1K pixel memory buffer and/or display the results onto a high resolution screen at specified video rates. It can also accommodate a wide variety of video signals from regular television video input to input from high-resolution cameras. By using the appropriate applications software, the Matrox board 24 can be controlled to allow image composition and it is to possible to display memory, live images and VGA graphics simultaneously. The video graphics board 24 allows an image from an external source to be digitized and written into memory. This function is frequently called "frame grabbing" or "image capture". Graphics information inputted by a professional photographer 34 using the data input device 28 can also be stored in the RAM memory 20 and overlaid with video information from the video camera 30 onto the video/graphics display screen 32, via the video graphics board 24. Those desiring more information concerning the design and operation of the video/graphics board 24 may refer to the manuals available from Matrox Electronics Systems Ltd. and relating to its ILLUMINATOR-16 video graphics board.

In using the system of FIG. 1, the professional photographer 34 will position an individual or a photograph of an individual in the field-of-view of the video camera 30, as represented by the "posed subject" symbol 36. Using his/her professional expertise, the subject will be properly posed so that when viewed on the video graphics display 32, the subject will appear in the position deemed most appropriate for the given pose. Next, using the data input device 28, mask information is entered into the computer using a common "paint" type applications program or a special "objects" program to record line and shape coordinates.

Special symbols are preassigned for such things as head location, chin location, hand location and any other item that can effect the portrait composition. The photographer then draws in these graphic symbols using the "paint" or the "objects" program. Text instructions may also be entered at this time for ultimately instructing the untrained operator on how to pose a subject, e.g., whether the pose is to be smiling or serious, etc. As this data is entered by the operator, it is overlaid on the video graphics display 32 under control of the video graphics board 24 so that the symbols conform to the body of the posed subject 36. The information is then stored with a designation or name for this pose, such as by subject's age, individual, couple, group size, double profile, exposure, type of prop, etc. Multiple poses may be composed and stored in the same manner.

Where a paint-type program is used to store raster images, one pixel value is predetermined to mean "no-overlay". That is, if that particular value is read from the mask raster stored in memory 20, then no overlay of live video is to occur at the camera system. If, on the other hand, the program employed is the "object" program, then the entire screen, not drawn by the objects, is taken to be no-overlay. The objects or symbols themselves are represented as numbers and each type of object will have a different header or storage method so that different shapes and functions may be accessed at the camera system. Examples of these objects to be drawn include lines, circles, arcs, text, etc.

Once all of the masks are thus composed by the professional photographer, they may be read out, via the I/O interface 22 to a disk drive 26, where they are stored on a magnetic disk which is transportable to any portrait studio and can then be used in a fashion yet to be described. The use of a disk drive is illustrative only and is not intended to limit the scope of the invention.

Referring to FIG. 2, there is depicted a block diagram of the equipment incorporated at the portrait studio where an untrained operator may pose a subject to be photographed in accordance with a previously created mask. The system of FIG. 2 is similar to that shown in FIG. 1 in that it includes a microprocessor 38 having an address bus 40 and a data bus 42 connected thereto in conventional fashion for controlling the execution of instructions stored in a ROM memory 44 and for entering or reading out information from a RAM memory 46. An I/O interface 48 is used to couple a data entry device 50 to the microprocessor 38. Further, a disk drive 52 may be interfaced to the microprocessor where the mask data is to be physically transported from the creation site to the studio where it is to be used.

A video graphics board 54, which again may be a Matrox board is connected across the address and data buses 40 and 42 and is adapted to receive input information from a portrait camera 56 having a video sensor incorporated therein. Such a camera may be of the type described in U.S. Pat. No. 5,055,863 assigned to Photo Controls Corporation of Minneapolis, Minn. That camera is cited merely for purposes of illustration and the present invention is not limited to a system incorporating that particular camera.

The video graphics board 54 is also arranged to output information to a video/graphics display device 58.

The magnetic disk prepared by the professional photographer using the equipment shown in FIG. 1 may be installed in the disk drive 52 in the portrait studio allowing its contents to be read, via I/O interface 48, into the RAM memory 46. When a subject is to be posed for a photograph, an untrained camera operator uses the data entry device 50 to specify a particular pose selected by the customer. With a customer positioned in the field-of-view of the camera 56, his/her video image will be presented on the display screen 58 along with the mask symbols oriented on the screen at the predetermined coordinate locations earlier specified when the mask information was developed. Now, by adjusting the zoom of the camera 56 or by moving the camera itself or the subject, that subject may be made to fit the confines of the mask symbols. That is to say, the top of the subject's head may be aligned with a line or arc on the video screen corresponding to the desired location for the top of the head in the selected pose while the video image of the subject's chin is made to align with a similar mask line on the screen. Once the subject has been positioned in accordance with the mask, the shutter may be tripped to record the image on film.

FIG. 3 is a software flow diagram for the application program executed by the microprocessor 12 in FIG. 1 when creating the mask information for later transfer to the portrait studio camera system of FIG. 2. As has already been mentioned, the mask information may be created using a commercially available "paint" type program or, alternatively, an object-type program may be used where specific structures, such as lines, circles, text, etc., can be selected for presentation and overlay on a video image. In this fashion, special symbols can be preassigned to specify where on the video screen the top of the subject's head should reside and then where the chin location should be, etc. With respect to FIG. 3, then, the program is entered at block 60 "Start Mask Construction". At step 62, the desired screen size and frame orientation, such as horizontal or vertical, is selected. Following that, a decision is made (block 64) whether a raster-type program or an object-type program is to be used in creating the mask lines on the screen. Where a paint or raster-type program is used, the associated commercially-available paint program is entered and the mask lines are drawn in accordance therewith (block 66). At the conclusion of the mask preparation, the information is stored (block 68) for later transfer to the camera system in the portrait studio (block 70).

Had the result of the decision at block 64 been that an object-type program was to be used in the mask construction, control would pass the decision block 72 where the operator selects which particular object, i.e., a line segment, a circle segment, a text or a flood fill is to be used and in each such event, the coordinates for the items to be drawn are specified as is the color information. In this regard, the objects themselves are represented as digital numbers including a header defining the object type and the color, starting and end point coordinates comprise further fields of the numbers. Once the operations identified by block 74 through 80 are completed, a test is made at block 82 to determine whether any further symbols are to be generated on the screen. If so, control loops back to decision block 72 and the further operations are executed. Once the test at block 82 shows that the mask has been completed, control passes to block 68 where the mask information is saved in a file for subsequent transfer to the camera system in block 70.

While the apparatus of FIGS. 1 and 2 show a disk drive 26 and 52 as the means for transferring the mask information, those skilled in the art can appreciate that digital information, once stored in the memory, can be transferred to the memory of another remote processor in a variety of ways other than physically transporting a disk storing the information from one system to the other. For example, a modem and telephone lines can be used to effect such a transfer. In this fashion, a professional photographer at a headquarters location can create posing masks and then transfer the mask information to any of a plurality of remote locations where less professionally experienced camera operators can use the mask information in posing subjects.

FIG. 4 is a software flow diagram for the program executed in the microprocessor 38 located at the remote portrait studio. The pose composition is selected by the camera operator with any computer input device, such as a keyboard, bar code wand, etc. (block 86). The pose file containing information defining the mask for the selected pose is then accessed while the video capture apparatus in the camera 56 feeds the subject's video image to the display 58, via the graphics board 54. See block 88 in FIG. 4. Next, a test is made at decision block 90 to determine whether the mask information is in the paint/raster-type format or object-type format. Assuming that it is the raster format, then each pixel of the raster is examined and either overlaid or not overlaid as directed by the raster image. As shown in the block diagram, this is accomplished by sequentially reading out each pixel as the pixel counter is advanced (block 92). The pixel is examined to determine whether it is to be overlaid or not (block 94) and, if so, the pixel is drawn on the display screen (block 96). If a given pixel is not to be overlaid, a test is made at 98 to determine whether that particular pixel was the last to be examined and, if so, control exits to block 100 where the camera operator now merely adjusts the position of the camera, the subject or the zoom so that the subject conforms to the mask. Had the test at block 98 indicated that there were more pixels to be examined, control loops back to the input of block 92 to advance the pixel counter so that the indicated sequence is repeated until all pixels defining the mask had been displayed on the video screen.

Had the test at decision block 90 indicated that an object-type program had been used to create the original mask, a decision is made at block 102 which object-type is to be drawn. If a line segment is to be drawn, the operation represented by block 104 is carried out and a line segment is drawn as defined by the stored coordinates. Likewise, if a circle, arc or flood fill is the object to be created on the screen, the operations represented by blocks 106, 108 and 110 are carried out. At the completion of each such operation, a test is made at decision block 112 to determine whether there are any more symbols to be drawn on the video screen to complete the pose mask for the selected pose. If so, control again passes to block 100 whereupon the camera operator fits the subject to the pose mask on the screen before tripping the camera shutter.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for facilitating the posing of a subject in a commercial portrait studio setting by an inexperienced photographer, comprising the steps of:

(a) providing a mask graphics generation station comprising a first digital computer having processing means operatively coupled to a video graphics board and a data storage device, a video camera and a video display terminal having a display screen operatively coupled to said video graphics board, and a data input device operatively coupled to said processing means;

(b) positioning a model in the field of view of said video camera in a plurality of preferred poses as determined by an experienced photographer to provide a video image of said model on said display screen of said video display terminal during each of said plurality of preferred poses;

(c) generating mask graphics on said video image of said model during each of said plurality of preferred poses to define positioning indicia representative of the position of said model during each of said plurality of preferred poses;

(d) storing mask data files at addressable locations in said data storage device representing said mask graphics for each of said plurality of preferred poses;

(e) providing a portrait camera system at a commercial studio site comprising a second digital computer having processing means operatively coupled to a video graphics board and said data storage device, a film camera having video sensing means and a video display terminal having a display screen operatively coupled to said video graphics board, and a data entry device operatively coupled to said processing means;

(f) transferring said mask data files from said data storage device of said mask graphics generation station to said data storage device of said portrait camera system;

(g) selecting one of said mask data files from said data storage device of said second digital computer to generate mask graphics on said display screen of said video display terminal corresponding to a selected one of said plurality of preferred poses;

(h) positioning a portrait subject within the field of view of said film camera such that said video sensing means of said film camera projects a video image of said portrait subject on said display screen of said video display terminal;

(i) adjusting at least one of the position of said portrait subject and the focus of said film camera such that said video image of said portrait subject conforms to said mask graphics on said display screen of said video display terminal; and (j) activating said film camera to record said portrait subject in said selected one of said plurality of preferred poses on photographic film.

2. The method as in claim 1 wherein said mask graphics includes alpha/numeric symbols.

3. The method as set forth in claim 1 and further, wherein step (c) includes the further sub-steps of:

(i) providing a paint type applications program cooperatively operable with said data input device and said processing means of said mask graphics generation station; and (ii) using said data input device to generate mask graphics on said video image of said model on said display screen of said video display terminal.

4. The method as set forth in claim 1 and further, wherein step (c) includes the further sub-steps of:

(i) providing an object type applications program cooperatively operable with said data input device and said processing means of said mask graphics generation station; and (ii) using said data input device to generate mask graphics on said video image of said model on said display screen of said video display terminal.

5. A method for improving pose quality in a commercial portrait studio operated by an inexperienced photographer, comprising the steps of:

(a) providing a commercial portrait studio including a digital computer having a video graphics board and a data storage device, a video display screen coupled to said video graphics board, a film camera having video image capture means coupled to said video graphics board, and a data entry device coupled to said data storage device;

(b) transferring mask graphics generated at a remote location to said data storage device, said mask graphics comprising computer generated positioning indicia representative of the position of a model within the field of view of a video camera during a professionally orchestrated pose;

(c) selectively projecting said mask graphics from said data storage device onto said video display screen;

(d) positioning a portrait subject within the field of view of said film camera until a video image of said portrait subject as displayed on said video display screen conforms to said mask graphics; and (e) activating said film camera to record on photographic film said portrait subject in said pose.

6. The method as set forth in claim 5 and further, said step (b) including the further sub-steps of:

(i) providing at said remote location a second digital computer having processing means cooperatively operable with a video graphics board and a data storage device, a video camera and a second video display screen coupled to said video graphics board, and a data input device coupled to said processing means;

(ii) positioning said model in the field of view of said video camera to provide said video image of said model on said second video display screen;

(iii) adjusting at least one of the position of said model and the focus of said film camera to produce said professionally orchestrated pose;

(iii) using said data input means to generate said mask graphics on said video image of said model during said professionally orchestrated pose;

(iv) storing said mask graphics in said data storage device of said second digital computer.

7. A system for facilitating the posing of a subject to be photographed, comprising:

(a) a model posing station at a first location including computer means having a microprocessor, a video graphics board, and memory means, video display means coupled to said video graphics board of said computer means for displaying a video image of a model as posed by an experienced photographer, and mask graphics generation means cooperatively operable with said video display means and said computer means for creating graphics indicia on said video image of said model representing the position of said model as so posed; and (b) a subject posing station at a commercial portrait studio location remote to said first location including computer means having a microprocessor, a video graphics board, and memory means, video display means coupled to said video graphics board, a film camera having video image capture means coupled to said video graphics board for displaying a video image of a subject as posed within the field of view of said film camera on said video display means, and mask graphics overlay means cooperatively operable with said video graphics board for overlaying said graphics indicia created by said experienced photographer at said model posing station on said video image of said subject;

whereby an inexperienced photographer can replicate the poses taken by said experienced photographer by adjusting one of the position of said subject within the field of view of said film camera and the focus of said film camera such that said video image of said subject conforms to said graphics indicia generated by said experienced photographer at said model posing station.

8. The apparatus as set forth in claim 7 and further, said mask graphics generation means including a data entry device coupled to said microprocessor and an object type applications program cooperatively operable with said data entry device and said microprocessor for generating mask graphics on said video image of said model.

9. The apparatus as set forth in claim 7 and further, said mask graphics generation means including a data entry device coupled to said microprocessor and a paint type applications program cooperatively operable with said data entry device and said microprocessor for generating mask graphics on said video image of said model.

10. The apparatus as set forth in claim 7 and further, said subject posing station including video display means coupled to said video graphics board and said video image capture means of said film camera for displaying said video image of said subject as posed within said field of view of said film camera.

11. The apparatus as set forth in claim 10 and further, said subject posing station including means for receiving said graphics indicia from said model posing station for storage in said memory means of said computer means of said subject posing station.

* * * * *